United States Patent
Zimmerbeutel et al.

(10) Patent No.: US 6,283,497 B1
(45) Date of Patent: Sep. 4, 2001

(54) AIRBAG MODULE AND A METHOD FOR ITS MANUFACTURE

(75) Inventors: Bernd Uwe Zimmerbeutel, Remscheid; Ralf Trimborn; Jens Hannemann, both of Wuppertal; Abelardo Fernandez, Duesseldorf, all of (DE)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/429,431

(22) Filed: Oct. 28, 1999

(30) Foreign Application Priority Data

Nov. 2, 1998 (DE) ............................................... 198 50 463

(51) Int. Cl.⁷ .................................................. B60R 21/16
(52) U.S. Cl. ....................................... 280/728.2; 280/732
(58) Field of Search ............................. 280/728.2, 728.1, 280/731, 732, 743.1; 292/91; 220/494.11

(56) References Cited

U.S. PATENT DOCUMENTS

| 5,310,213 | * | 5/1994 | Mori ...................................... 280/732 |
| 5,320,379 | * | 6/1994 | Burnard et al. ..................... 280/728.2 |
| 5,356,174 | * | 10/1994 | Rhein et al. .......................... 280/732 |
| 5,556,124 | * | 9/1996 | Olson ................................. 280/728.1 |
| 5,560,644 | * | 10/1996 | Fiore ................................. 280/728.2 |
| 5,607,179 | * | 3/1997 | Lenart et al. ...................... 280/728.2 |
| 5,639,112 | * | 6/1997 | Phillion et al. .................... 280/728.2 |
| 5,855,391 | * | 1/1999 | Holland ................................. 280/731 |
| 5,876,058 | * | 3/1999 | Nemoto ................................. 280/732 |
| 6,010,146 | * | 1/2000 | Otsuka et al. ........................ 280/732 |
| 6,092,832 | * | 7/2000 | Worrell et al. ..................... 280/728.2 |

FOREIGN PATENT DOCUMENTS

| 297 06 246 U1 | 9/1997 | (DE) . |
| 2323572 | 9/1998 | (GB) . |

* cited by examiner

Primary Examiner—J. J. Swann
Assistant Examiner—Christopher Bottorff
(74) Attorney, Agent, or Firm—Kathryn A. Marra

(57) ABSTRACT

An airbag module for motor vehicles includes a housing for a folded together inflatable airbag and a holder element that can be locked at the housing. The holder element has at least one locking section, which in the locked state extends along the housing wall and latches with a holder section of the housing at its side which faces away from the housing wall.

17 Claims, 1 Drawing Sheet

AIRBAG MODULE AND A METHOD FOR ITS MANUFACTURE

TECHNICAL FIELD

The invention relates to an airbag module for motor vehicle having a housing for a folded together inflatable airbag and a holder element that can be locked at the housing and a method for making same.

BACKGROUND OF THE INVENTION

Airbag modules are known in principle and serve to mount a folded together inflatable airbag together with a gas generator, which inflates the airbag in the event of a collision, as a unit in a motor vehicle, e.g. as a driver's, a passenger's or as a side airbag.

It is an object of the present invention to provide an airbag module for motor vehicles and a method for securing a holder element at a housing of the airbag module that permits as simple and rapid an assembly of the airbag module as possible.

SUMMARY OF THE INVENTION

The object of the present invention is accomplished by providing an air bag module having a holder element that has at least one locking section that extends along the housing wall in the latched state and that is latched to the holder section of the housing on its side, which faces away from the housing wall.

In accordance with the present invention the holder element can be locked without additional securing means such as clamps, screws or rivets, through which the manufacture of the airbag module is considerably simplified. The method that is provided in accordance with the present invention for the latching of the locking section with the holder section of the housing enables the holder element to be securely locked in one step through a single relative movement between the holder element and the housing. The holder element is, thus, formed in accordance with the invention as a holder clip that can be pushed or clipped onto or at the housing.

In accordance with a preferred embodiment of the present invention, the locking section is clamped in between the holder section, such as a latch region of the holder section that projects in the direction of the housing wall, and a projection that is arranged at the housing wall.

Through this the locking section—and thereby the holder element—is held by the projection in a definite latching position relative to the housing in the latched state. In addition the holder element is secured by the projection in its locked position in such a manner that the holder element and the housing can not arrive out of engagement by themselves.

In accordance with a further preferred embodiment of the present invention, the holder section and the housing wall bound an intermediate space for the locking section that ends ahead of the projection, with the holder section extending approximately parallel to the housing wall.

The holder element can be introduced with its locking section into an intermediate space of this kind in order to provide for a definite relative movement between the holder element and the housing when producing the latching between the housing and the holder element.

In accordance with a further preferred embodiment of the present invention, the projection that is arranged at the housing wall has a deflection surface that is designed for the deflection of the locking section, in particular of a free end region of the locking section, away from the housing wall and that preferably extends at an inclination to the housing wall at an angle of approximately 20° to 60°.

By means of a deflection surface of this kind the free end region of the locking section is automatically guided away from the housing wall and into a position which enables a latching with the holder section of the housing when the holder element and the housing are moved relative to one another. In this way a method for the assembly of an airbag is created through the present invention that is conceivably simple and as a result is advantageous for mass production.

In manufacturing the air bag module of the present invention, the locking section of the holder element has a free end region that is moved preferably approximately parallel to the housing wall in the direction of a projection that is arranged at the housing wall. The free end region of the locking section is then pressed against a deflection surface that preferably extends at an inclination to the housing wall, and the locking section is latched with a holder section of the housing.

In accordance with the present invention, the holder element is transferred into its final position through a relative movement between the holder element and the housing and in this the locking section of the holder element is automatically moved in such a manner that it is latched with the holder section when it reaches its final position. Consequently, the locking of the holder element at the housing can be achieved without additional aids and through merely one single relative movement between the holder element and the housing.

Further embodiments of the invention are set forth in the subordinate claims, in the description and in the figure.

BRIEF DESCRIPTION OF THE DRAWING

The present invention will now be described, by way of example, with reference to the accompanying drawing, in which.

DESCRIPTION OF THE PREFERRED EMBODIMENT

Figure 1:
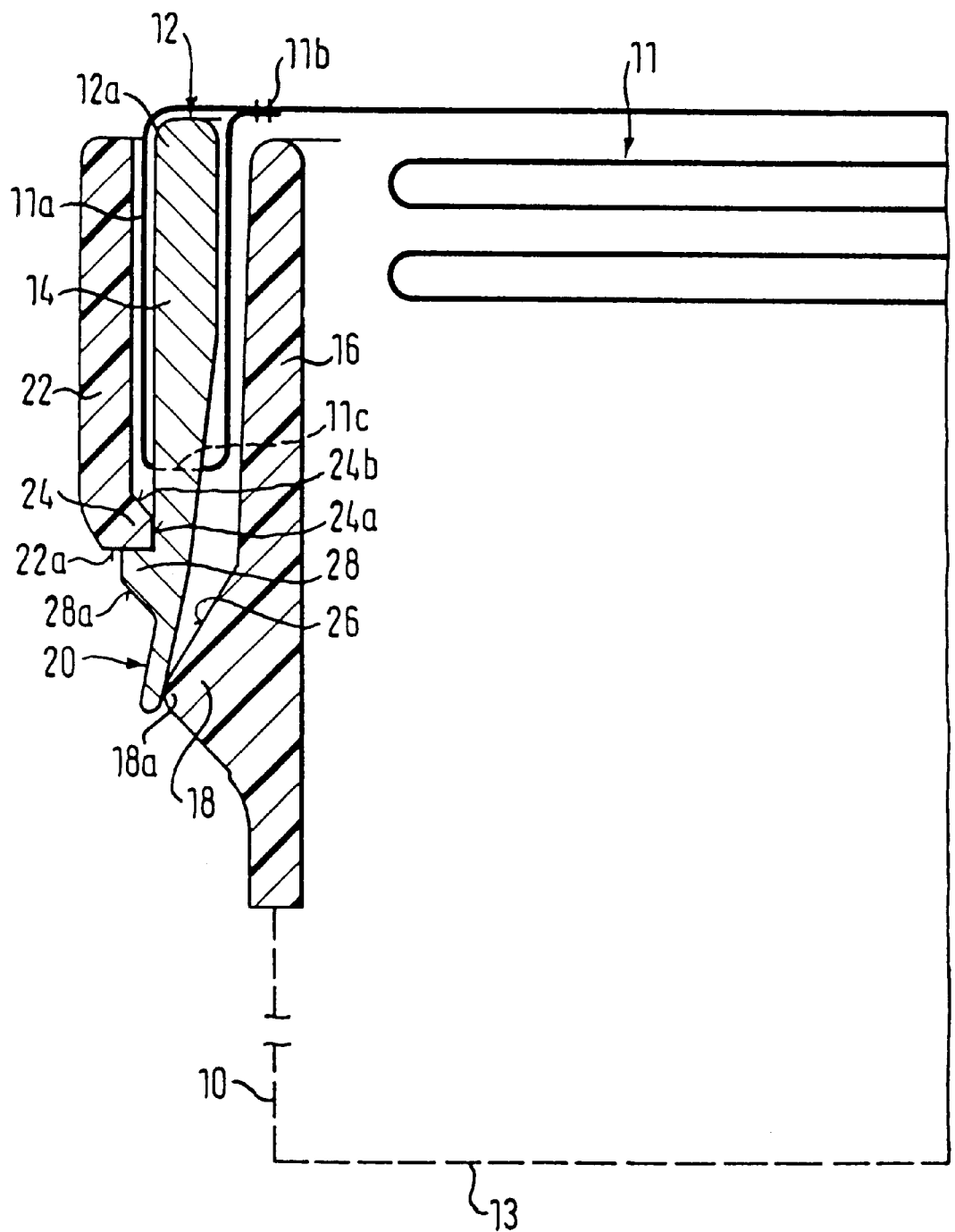
FIG. 1 is a partial cross-sectional view of a housing and a holder element of an embodiment of an airbag module in accordance with the invention.

In accordance with the figure, the airbag module comprises an approximately cylindrical housing 10, of which merely a part of a housing wall 16 is illustrated in a sectioned side view. The remaining part of the housing wall 16 and a base section 13 of the housing 10, which closes off the housing 10, are partly indicated by a broken line. The housing 10 consists preferably of plastic, but can also be manufactured of metal, such as steel.

A folded together inflatable airbag 11, which is merely partly illustrated and schematically indicated in the figure, is arranged in the housing 10. The securing of the airbag 11 at the housing 10 takes place by means of a holder element 12, which is explained in more detail in the following.

The housing 10 has a plurality of regions that are arranged in the peripheral direction, which are described in more detail in the following with reference to the example shown in the figure, and which are in each case associated with a locking section 14 of the ring-shaped holder element 12. The holder element 12 is connected to the folded together inflatable airbag 11, with the locking sections 14 serving as the securing means of the holder element 12 at the housing 10.

In the case of a cylindrical housing 10, the holder element 12 has the form of a circular ring with locking sections 14 that project from a ring-shaped section 12a. However, in deviation from this design, the housing 10 and the holder element 12 can in principle have any other form, for example an approximately rectangular, cross-sectional shape.

The figure shows the state of the airbag module in which the holder element 12 is already located in its final position and is locked at the housing 10 through latching.

On the outside at the housing wall 16, the housing 10 is provided with a plurality of projections 18 that are in each case associated with a locking section 14 of the holder element 12. The projections 18 are in each case provided with a deflection surface 26 that extends at an inclination to the housing wall 16, with the angle between the deflection surface 26 and the housing wall 16 amounting to approximately 30° to 35° in the illustrated embodiment, but with it also being possible for it to be chosen greater or smaller.

Above the projection 18 the housing wall 16 is designed to be double walled and is provided with a circumferential collar that extends parallel to the housing wall 16 and that serves as a holder section 22. The holder section 22 is connected at its lower end to the housing wall 16. In this way the holder section 22 and the housing wall 16 bound an intermediate space in the form of a circumferential groove. Cut-outs are provided in the base of this groove through which the locking sections 14 of the holder element 12 are passed.

The lower edge region of the holder section 22 and, thus, the lower end of the intermediate space, which faces the projection 18, is spaced from the inclined deflection surface 26 of the projection 18.

In the region of its lower end, the holder section 22 is provided with a latching region 24 that projects in the direction of the housing wall 16. The transition region between the side of the holder section 22 facing the housing wall 16 and the latching region 24 is provided with an inclined surface 24b for achieving a more gentle transition.

The free end 18a of the projection 18 that points away from the housing wall 16 and the free end of the latching region 24 of the holder section 22 that faces the housing wall 16, which has an end surface 24a that extends parallel to the housing wall 16, lie approximately in the same plane, which extends parallel to the housing wall 16, with the free end 18a lying slightly closer to the housing wall 16 than the end surface 24a. The lower end side 22a of the holder section 22 lies approximately in that plane, which extends perpendicular to the housing wall 16 in which the inclined deflection surface 26 of the projection 18 merges into the housing wall 16.

In accordance with the figure, the locking section 14 of the holder element 12, which preferably consists of steel or aluminium, is passed through the intermediate space between the housing wall 16 and the holder section 22. The locking section 14 contracts in the direction of a free end region 20, with which the locking section 14 lies in contact at the projection 18, that cooperates with the projection 18 representing the region of the lowest material strength of the locking section 14.

On its side that faces away from the housing wall 16 in the locked state the locking section 14 has a latching section 28 that is formed in the manner of a projection and which engages behind the latching region 24 of the holder section 22 in the locked state.

In the position in accordance with the figure, the latching section 28 of the locking section 14 lies at the lower end side 22a and at the end surface 24a of the latching region 24, which forms the free end and which extends at a right angle to the lower end side 22a. As a result, the locking section 14 is held immovable relative to the housing 10 between the holder section 22 and the projection 18. The locking section 14 can be designed in such a manner that it is elastically deformed in the locked and latched position in accordance with the figure, i.e. is under tension, and is thus clamped in between the housing wall 16 and the holder section 22.

The contraction of the locking section 14 in the direction of its free end region 20 is achieved by cutting material out of the side that faces the housing wall 16 in the locked state, and by having this side extend at an inclination to the housing wall 16 from the ring-shaped section 12a of the holder element 12 up to the free end region 20. Furthermore, the side of the locking section 14 that faces away from the housing wall 16 extends parallel to the housing wall 16 up to the latching section 28. The free end region 20 of the locking section 14 lying beneath the latching section 28 is slightly angled off outwardly relative to the ring-shaped section 12a of the holder element 12 in the locked state.

Before the locking sections 14 are passed through the intermediate space that is formed by the housing wall 16 and the holder section 22 for securing the holder element 12 at the housing 10, the airbag 11 is secured to the holder element 12. To accomplish this, the ring-shaped section 12a of the holder element 12, from which the locking sections 14 project, is sewn into the airbag 11. An edge region 11a of the airbag 11, which borders the open end of the airbag 11, is placed around the holder element 12 and is sewn with a region of the airbag 11 that is further remote from the open end. In accordance with the figure, the seam 11b is provided at a location that lies outside the housing 10 near the housing wall 16 in the locked state.

The locking sections 14 of the holder element 12 are pushed through holes 11c, which are formed in the airbag 11 during the placing of the airbag 11 around the holder element 12, so that the locking sections 14 protrude out of the hose-shaped space in which the ring-shaped section 12a of the holder element 12 is sewn in and can be brought into engagement with the housing 10.

In order to secure the holder element 12 at the housing 10, the holder element 12 and its locking sections 14 are first oriented approximately parallel to the housing wall 16.

The holder element 12 and the housing 10 are then moved relative to one another in such a manner that the locking sections 14 of the holder element 12 are passed through the intermediate space that is formed by the housing wall 16 and the holder section 22.

When the free end regions 20 of the locking sections 14 strike against the projections 18, they are in each case deflected outwardly away from the housing wall 16 in a direction that is predetermined by the deflection surface 26. Through this the latching sections 28 of the locking sections 14 are pressed outwardly away from the housing wall 16 against the holder sections 22. In a further movement of the locking sections 14 in the direction of the projections 18, the latching regions 24 of the holder section 22 ensure that the locking sections 14 are again moved in the direction of the housing wall 16. Thus, the inclined surfaces 24b of the latching regions 24 cooperate in each case with the inclined surfaces 28a of the latching sections 28. The locking sections 14 are consequently elastically deformed in their free end regions 20, with merely a comparatively smaller force being required for this as a result of their comparatively lesser material strength.

When the holder element 12 is moved further in the direction of the projections 18, the latching sections 28 finally jump behind the latching regions 24 of the holder section 22, through which the latching between the locking sections 14 and the holder section 22 is achieved and the state in accordance with the figure is reached. As a result of the elastic deformability of the locking sections 14 in the free end regions 20 the free end regions 20 can now at least partly move back. Thus, it is dependent of the geometric relationships whether the locking sections 14 again take on their original shape or remain under tension.

While the present invention has been described as carried out in specific embodiments thereof, it is not intended to be limited thereby but is intended to cover the invention broadly within the scope and spirit of the appended claims.

What is claimed is:

1. An airbag module for motor vehicles comprising:

an inflatable airbag;

a housing for the inflatable airbag, the housing having a housing wall and a holder section connected to the housing wall at the lower end thereof to bound an intermediate space therebetween; and a holder element capable of being locked at the housing and having at least one locking section, wherein the locking section extends along the housing wall in the locked state and latches with the holder section of the housing at a side that faces away from the housing wall, wherein the locking section is secured in the locked state by means of projection extending from the housing wall, the holder section including a latching region that projects in the direction of the housing wall such that the locking section is clamped between the latching region and the projection.

2. The airbag module as recited in claim 1, wherein one of the locking section and the holder section is elastically deformable.

3. The airbag module as recited in claim 1, further comprising a projection-like latching section arranged at a side of a locking section that faces away from the housing wall for latching with the latching region of the holder section.

4. The airbag module as recited in claim 1, further comprising a free end of the projection that extends away from the housing wall and lying in a first plane, and an end surface of the latching region that faces the housing wall and lies in a second place, different from the first plane, and wherein each of the free end and the surface extend approxiamately perpendicular to the housing wall and at least approxiamately in the same plane that extends approxiamately parallel to the housing wall.

5. The airbag module as recited in claim 1, wherein the locking section further comprises a free end region the cooperates with the projection.

6. The airbag module as recited in claim 1, wherein the holder element is ring-shaped and has a plurality of locking sections distributedly arranged in a peripheral direction.

7. The airbag module as recited in claim 1, wherein the holder element comprises one of steel and aluminum and the housing is manufactured of plastic.

8. An airbag module for motor vehicles comprising:

an inflatable airbag;

a housing for the inflatable airbag, the housing having a housing wall and a holder section connected to the housing wall at a lower end thereof to bound an intermediate space therebetween; and a holder element capable of being locked at the housing and having at least one locking section, wherein the locking section extends along the housing wall in the locked state and latches with the holder section of the housing at a side that faces away from the housing wall, wherein the locking section is secured in the locked state by means of a projection extending from the housing wall, and wherein the intermediate space ends ahead of the projection and the holder section extends approxiamately parallel to the housing wall.

9. The airbag module as recited in claim 8, wherein one of the locking sections and the holder section are elastically deformable.

10. The airbag module as recited in claim 8, wherein the locking section further comprise a free end region that cooperates with the projection.

11. The airbag module as recited in claim 8, wherein the holder element is ring-shaped and has a plurality of locking sections distributedly arranged in a peripheral direction.

12. The airbag module as recited in claim 8, wherein the holder element comprises one of steel and aluminum and the housing is manufactured of plastic.

13. An airbag module for motor vehicles comprising:

an inflatable airbag;

a housing for the inflatable airbag, the housing having a housing wall and holder section connected to the housing wall at a lower end thereof to bound an intermediate space therbetween; and a holder element capable of being locked at the housing and having at least one locking section, wherein the locking section extends along the housing wall in the locked state and latches with the holder section of the housing at a side that faces away from the housing wall, wherein the locking section is secured in the locked state by means of a projection extending from the housing wall, and wherein the projection has a deflection surface for deflecting the locking section away from the housing wall and extends at an inclination to the housing wall at an angle of approxiamately 20° degrees to 60° degrees.

14. The airbag module as recited in claim 13, wherein one of the locking sections and holder section are elastically deformable.

15. The airbag module as recited in claim 13, wherein the locking section further comprises a free end region that cooperates with the projection.

16. The airbag module as recited in claim 13, wherein the holder element is ring-shaped and has a plurality of locking sections distributedly arranged in a peripheral direction.

17. The airbag module as recited in claim 13, wherein the holder element comprises one of steel and aluminum and the housing is manufactured of plastic.

* * * * *

UNITED STATES PATENT AND TRADEMARK OFFICE
Certificate

Patent No. 6,283,497

Patented: September 4, 2001

On petition requesting issuance of a certificate for correction of inventorship pursuant to 35 U.S.C. 256, it has been found that the above identified patent, through error and without any deceptive intent, improperly sets forth the inventorship.

Accordingly, it is hereby certified that the correct inventorship of this patent is: Bernd Uwe Zimmerbeutel, Remscheid; Ralf Trimborn, Jens Hannemann, both of Wuppertal, Abelardo Fernandez, Duesseldorf; Ulrich Rick, Roxheim, all of Germany.

Signed and Sealed this Seventh day of January 2003.

BRIAN L. JOHNSON
*Supervisory Patent Examiner*
Art Unit 3618